United States Patent [19]
Buchholz et al.

[11] Patent Number: 6,088,340
[45] Date of Patent: Jul. 11, 2000

[54] METHOD AND APPARATUS IN A WIRELESS COMMUNICATION SYSTEM FOR CONTROLLING A DISPLAY OF TEMPLATE DATA BY A PROTABLE SUBSCRIBER UNIT

[75] Inventors: Dale Robert Buchholz, Palatine; Bashar Jano, Schaumburg, both of Ill.; Kevin Robert Wagner, Fort Worth, Tex.

[73] Assignee: Motorola, Inc., Schaumburg, Ill.

[21] Appl. No.: 09/102,957

[22] Filed: Jun. 23, 1998

[51] Int. Cl.⁷ ........................................................ G09G 5/00
[52] U.S. Cl. .......................... 370/310; 455/418; 455/517; 455/575
[58] Field of Search ..................... 370/310, 328; 455/517, 418, 419, 420, 425, 550, 575, 561

[56] References Cited

U.S. PATENT DOCUMENTS

| | | | |
|---|---|---|---|
| 5,321,737 | 6/1994 | Patsiokas | 455/414 |
| 5,561,446 | 10/1996 | Montlick | 455/517 |
| 5,896,566 | 4/1999 | Averbuch et al. | 455/419 |
| 5,909,437 | 6/1999 | Rhodes et al. | 370/349 |

OTHER PUBLICATIONS

Wireless Application Protocol Forum, Ltd., *Wireless Application Protocol Wireless Markup Language Specification*, cover & pp. 5, 8, 16, 27–32, Apr. 1998, World Wide Web.

*Primary Examiner*—Huy D. Vu
*Attorney, Agent, or Firm*—R. Louis Breeden

[57] ABSTRACT

A pack (209) is programmed (402) into a portable subscriber unit (122), the pack including a bundle of templates for formatting template data received for display on at least one page. A server (124) then transmits (404) the template data through the wireless communication system. The portable subscriber unit receives (406) the template data and displays (408) the template data in accordance with the pack.

17 Claims, 4 Drawing Sheets

METHOD AND APPARATUS IN A WIRELESS COMMUNICATION SYSTEM FOR CONTROLLING A DISPLAY OF TEMPLATE DATA BY A PROTABLE SUBSCRIBER UNIT

FIELD OF THE INVENTION

This invention relates in general to wireless communication systems, and more specifically to a method and apparatus in a wireless communication system for controlling a display of template data by a portable subscriber unit.

BACKGROUND OF THE INVENTION

Information services are becoming increasingly popular in the wireless service market as they can provide subscribers with up-to-date information on stocks, sports, news, and the like. To increase the value of these services it is helpful to customize them for each individual subscriber. Customization is not desirable, however, if it requires a large increase in the amount of traffic traveling over the air.

In prior art wireless communication systems, information services providers have broadcast data to an information service address which the subscriber unit uses to identify information. If the subscriber unit has the address activated in its registry, it reads and processes the data. The display of the data, however, has not been configurable by the end-user.

In a similar vein, prior art wireless communication systems have begun to support access to the Internet. Wireline techniques and protocols for Internet access have been tried in wireless systems, but have encountered problems. The technique of requesting a single WEB page (or portion of a page) and then displaying the page (or portion) before requesting another page (or another portion of the same page), as currently used in the wireline protocols, can introduce excessive latency in store-and-forward wireless systems. This is because such systems must queue each response until adequate air time becomes available to transmit the response.

One prior art technique, known as the Wireless Application Protocol (WAP), has partially addressed the latency problem by sending multiple WEB pages, for example, in a single transmission as a "deck" of "cards," each card corresponding to a page of structured content and navigation specifications. Each WAP card, however, has combined the data to be displayed, with formatting instructions used in controlling the display of the data, thereby disadvantageously causing data downloads to be larger than necessary whenever the data uses a fixed display format.

Thus, what is needed is a method and apparatus in a wireless communication system for controlling a display of data by a portable subscriber unit. In particular, what is needed is a method and apparatus that can reduce the size of data downloads and that can allow customization the display of the data according to the desires of the enduser.

SUMMARY OF THE INVENTION

An aspect of the present invention is a method in a wireless communication system for controlling a display of template data by a portable subscriber unit. The method comprises the steps of programming a pack into the portable subscriber unit, the pack comprising a bundle of templates for formatting the template data for display on at least one page; and transmitting the template data from a server in the wireless communication system. The method further comprises the steps of receiving the template data by the portable subscriber unit, and displaying the template data in accordance with the pack.

Another aspect of the present invention is a portable subscriber unit in a wireless communication system for controlling a display of template data received from a server. The portable subscriber unit comprises a transceiver for communicating with the server to receive the template data, and a processing system coupled to the receiver for processing the template data, the processing system comprising a memory. The portable subscriber unit further comprises a user interface coupled to the processing system for displaying the template data and for accepting an input from a user. The processing system is programmed with a pack comprising a bundle of templates for formatting the template data for display on at least one page. The processing system is further programmed to cooperate with the user interface to display the template data in accordance with the pack.

Another aspect of the present invention is a server in a wireless communication system for controlling a display of template data by a portable subscriber unit. The server comprises a communication interface coupled to a controller of the wireless communication system for communicating therewith, and a processing system coupled to the communication interface for processing information communicated through the communication interface, the processing system comprising a memory. The processing system is programmed to send a pack to the portable subscriber unit, the pack comprising a bundle of templates for formatting the template data for display on at least one page, and to transmit the template data to the wireless communication system for display by the portable subscriber unit in accordance with the pack.

DETAILED DESCRIPTION OF THE DRAWINGS

Figure 1:
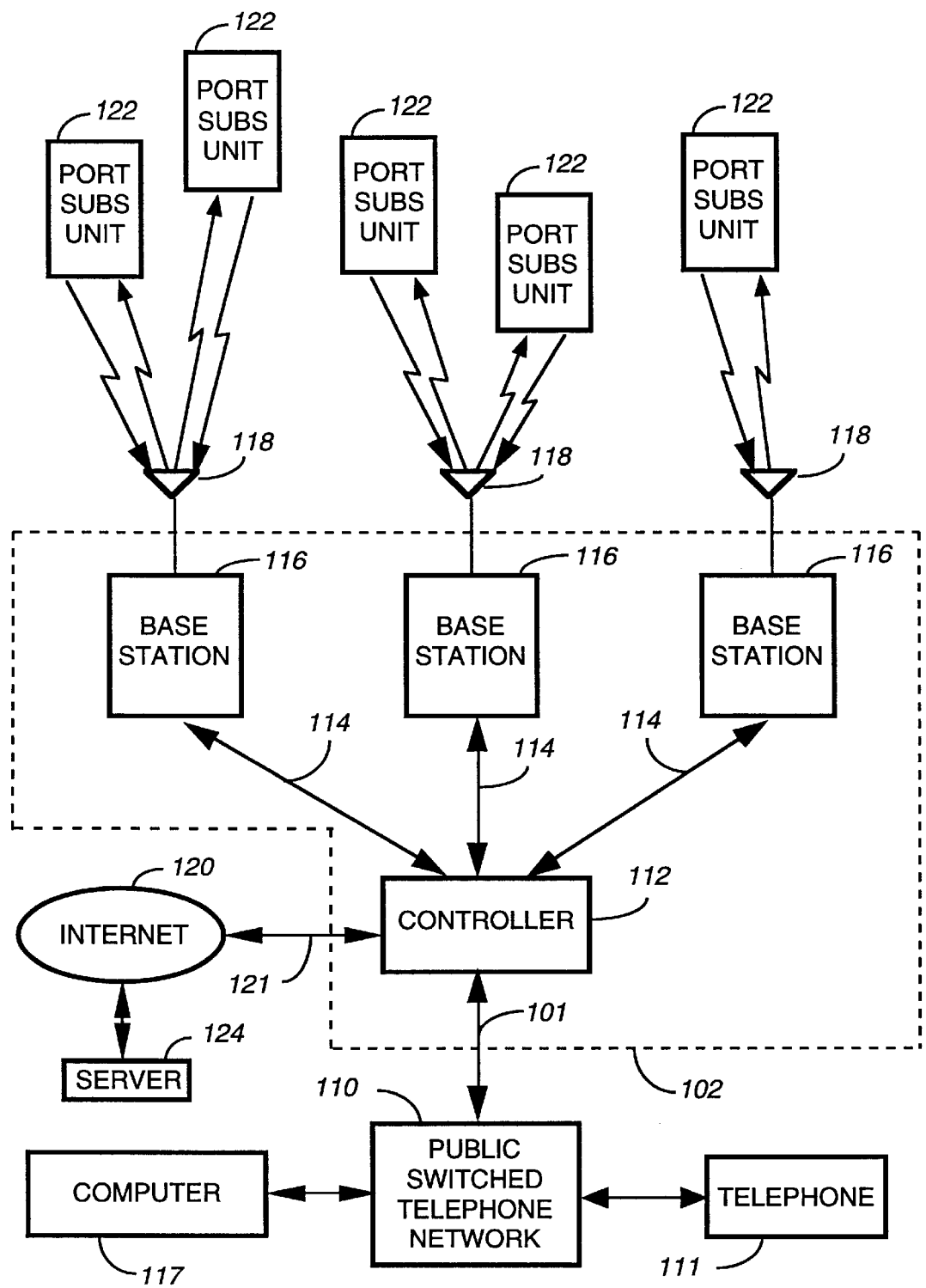
FIG. 1 is an electrical block diagram of a wireless communication system in accordance with the present invention.

Referring to FIG. 1, an electrical block diagram depicts an exemplary wireless communication system in accordance with the present invention, comprising an infrastructure portion 102 including a controller 112 and a plurality of conventional base stations 116, the communication system also including a plurality of portable subscriber units 122. The base stations 116 preferably communicate with the portable subscriber units 122 utilizing conventional radio frequency (RF) techniques, and are coupled by conventional communication links 114 to the controller 112, which controls the base stations 116.

The controller 112 is preferably a combination of the Wireless Messaging Gateway (WMG™) Administrator! paging terminal, and the RF-Conductor!™ message distributor manufactured by Motorola, Inc. The base stations 116 are preferably a combination of the RF-Orchestra! transmitter and RF-Audience!™ receiver manufactured by Motorola, Inc. The portable subscriber units 122 are preferably similar to PageWriter™ 2000 data messaging units, also manufactured by Motorola, Inc., and having software modified in accordance with the present invention. It will be appreciated that other similar equipment can be utilized as well for the controller 112, the base stations 116, and the portable subscriber units 122.

Each of the base stations 116 transmits RF signals to the portable subscriber units 122 via an antenna 118. The base stations 116 preferably each receive RF signals from the plurality of portable subscriber units 122 via the antenna 118. The RF signals transmitted by the base stations 116 to the portable subscriber units 122 (outbound messages) comprise selective call addresses identifying the portable subscriber units 122, and data messages originated by message originators, as well as commands originated by the controller 112 for adjusting operating parameters of the radio communication system, and packs for formatting the display of template data in accordance with the present invention, as described further below. The RF signals transmitted by the portable subscriber units 122 to the base stations 116 (inbound messages) comprise responses that include scheduled messages, such as positive acknowledgments (ACKs) and negative acknowledgments (NAKs), and unscheduled messages, such as registration requests and pack requests.

The controller 112 preferably is coupled by telephone links 101 to a public switched telephone network (PSTN) 110 for receiving selective call message originations therefrom. Selective call originations comprising data messages from the PSTN 110 can be generated, for example, from a conventional telephone 111 or a conventional computer 117 coupled to the PSTN 110. In addition, the controller 112 preferably is coupled through a conventional communication link 121 to the Internet 120 for acquiring information, e.g., packs and template data, from at least one server 124 also coupled to the Internet. It will be appreciated that, alternatively, the server 124 can be included as an integral portion of the controller 112.

The over-the-air protocol utilized for outbound and inbound messages is preferably selected from Motorola's well-known FLEX™ family of digital selective call signaling protocols. These protocols utilize well-known error detection and error correction techniques and are therefore tolerant to bit errors occurring during transmission, provided that the bit errors are not too numerous. It will be appreciated that other suitable protocols can be used as well.

Figure 2:
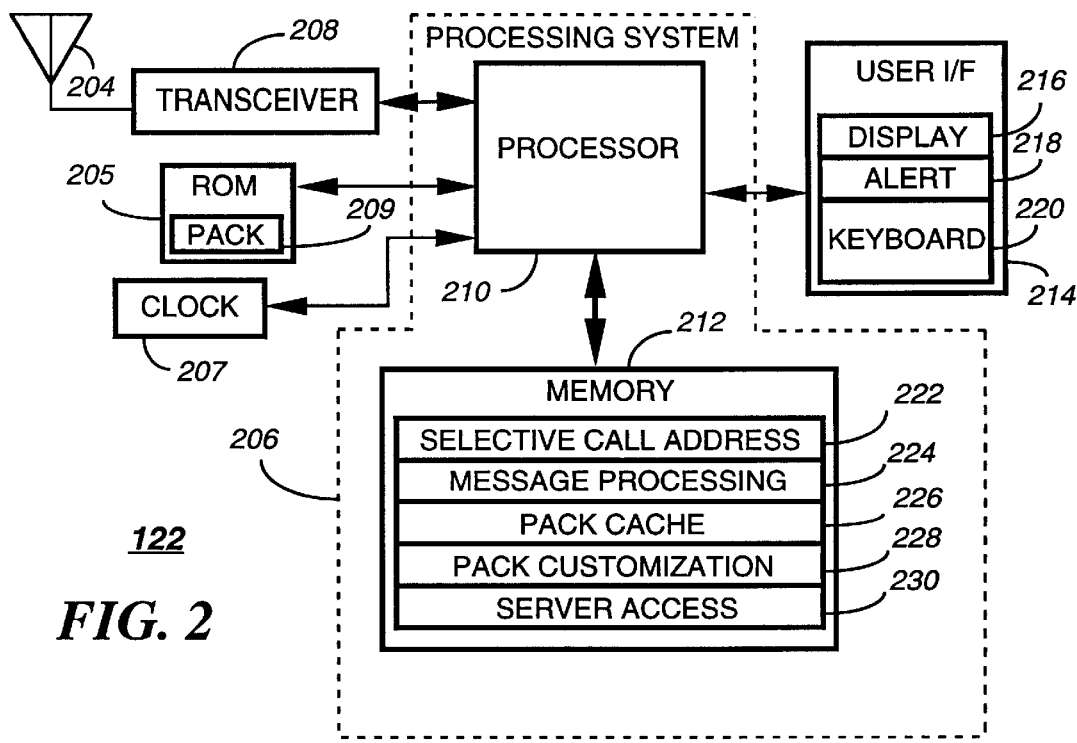
FIG. 2 is an electrical block diagram of a portable subscriber unit in accordance with the present invention.

FIG. 2 is an electrical block diagram of an exemplary portable subscriber unit 122 in accordance with the present invention. The portable subscriber unit 122 comprises an antenna 204 for intercepting an outbound message and for transmitting an inbound message. The antenna 204 is coupled to a conventional transceiver 208 for receiving the outbound message and for transmitting the inbound message. The transceiver 208 is coupled to a processing system 206 for processing the outbound and inbound messages and for controlling the portable subscriber unit 122 in accordance with the present invention. A user interface 214 preferably is also coupled to the processing system 206 for interfacing with a user. The user interface 214 comprises a conventional display 216 for displaying the inbound and outbound messages, a conventional alert element 218 for alerting the user when the outbound message arrives, and a conventional keyboard 220 for generating the inbound message and for controlling the portable subscriber unit 122. A conventional clock 207 is also coupled to the processing system 206 for supporting time keeping requirements of the portable subscriber unit 122. In addition, a conventional read-only memory (ROM) 205 is coupled to the processing system 206. The ROM 205 comprises a pack 209 for formatting template data for display on at least one page, as described further below.

The processing system 206 comprises a conventional processor 210 and a conventional memory 212, preferably a random access memory (RAM). The memory 212 comprises software elements and other variables for programming the processing system 206 in accordance with the present invention. The memory 212 preferably includes a selective call address 222 to which the portable subscriber unit 122 is responsive. In addition, the memory 212 includes a message processing element 224 for programming the processing system 206 to process messages through well-known techniques. The memory 212 further comprises a pack cache 226 for storing a pack utilized by the portable subscriber unit 122 in accordance with the present invention, as is described further below. The memory 212 also includes a pack customization element 228 for programming the processing system 206 to customize the pack. In addition, the memory 212 includes a server access element 230 for programming the processing system 206 to allow a user to access the server 124 for creating, modifying, and downloading a pack.

Figure 3:
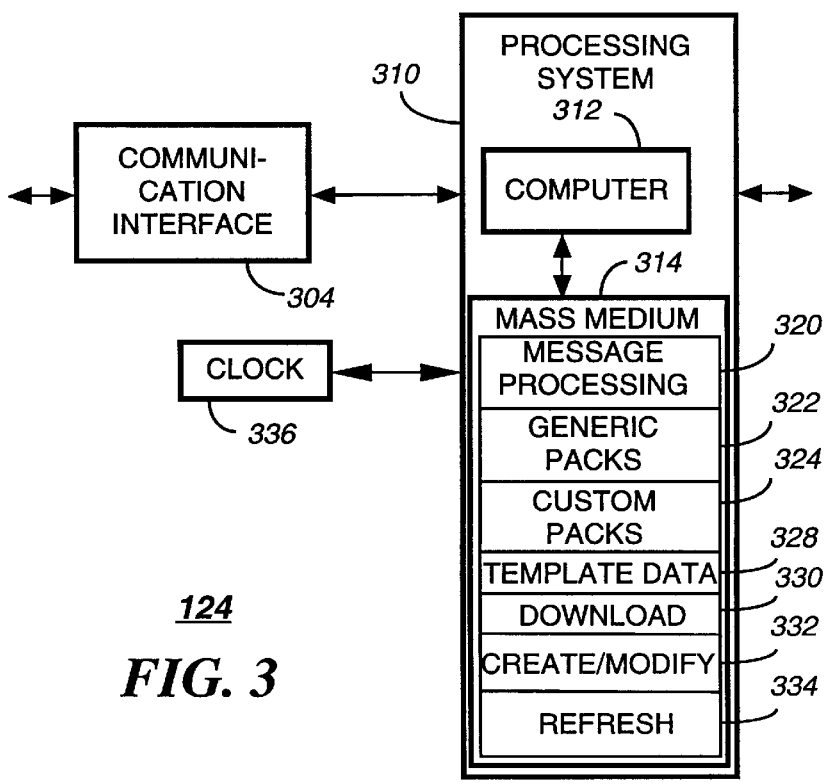
FIG. 3 is an electrical block diagram of a server in accordance with the present invention.

FIG. 3 is an electrical block diagram depicting an exemplary server 124 in accordance with the present invention. The server 124 comprises a conventional communication interface 304 for communicating with the portable subscriber unit 122 through the Internet and through the infrastructure portion 102 of the wireless communication system. The communication interface 304 is coupled to a processing system 310 for controlling and communicating with the communication interface 304. The processing system 310 is also coupled to a conventional clock 336 for providing a timing signal to the processing system 310. The processing system 310 comprises a conventional computer 312 and a memory, preferably a conventional mass medium 314, e.g., a magnetic disk drive, programmed with information and operating software in accordance with the present invention. The mass medium 314 comprises a conventional message processing element 320 for processing messages communicated with the portable subscriber unit 122 through well-known techniques. The mass medium 314 also includes generic packs 322 that can be downloaded to the portable subscriber unit 122 for controlling the display of template data. In addition, the mass medium 314 includes custom packs 324 that have been customized by a user of the portable subscriber unit 122. The mass medium 314 further comprises template data 328 which is to be transmitted to the portable subscriber unit 122 and formatted for display in accordance with a pack programmed into the portable subscriber unit 122. In addition, the mass medium 314 comprises a download element 330 for programming the processing system 310 to download a pack to the portable subscriber unit 122. The mass medium 314 also includes a create/modify element for programming the processing system 310 to allow a user to create and modify a pack. The mass medium 314 further comprises a refresh element 334 for programming the processing system 310 to periodically refresh the pack in a portable subscriber unit 122.

Figure 4:
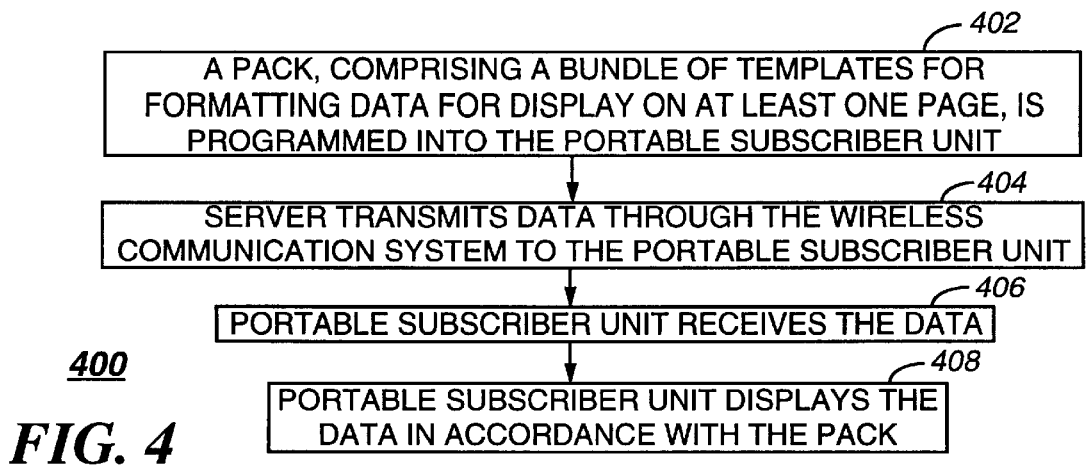
FIG. 4 is a flow diagram depicting an operation of the wireless communication system in accordance with the present invention.

FIG. 4 is a flow diagram 400 depicting an operation of the wireless communication system in accordance with the present invention. The flow begins when a pack is programmed 402 into the portable subscriber unit 122. The pack preferably comprises a bundle of templates for formatting template data for display on at least one page. A template is a pattern utilized by the processing system 206 and the user interface 214 to lay out the presentation of information to the user. The template is created by using a template mark-up language, similar to the Hypertext Mark-up Language (HTML) used in creating World Wide Web pages. A template can, for example, define where, and in what size and color, the corresponding template data is to be displayed. The templates of the pack can be related or unrelated in form and functionality, depending upon the use for which the deck and template data are intended. A "page," as used herein, refers to a screen of displayed information. The distinction between "pack" and "template data," as used herein, is that the pack represents a bundle of templates for displaying template data, and the template data is used by the processing system 206 and the user interface 214 to fill in the templates. It will be appreciated that the pack can consist of a single template, e.g., when the amount of template data is small. It will be further appreciated that a user can have a plurality of packs stored in a plurality of locations, e.g., in the server 124, in a personal computer (not shown), in the controller 112, or in the portable subscriber unit 122 (either in the ROM 205 or in the pack cache 226).

After an appropriate pack has been programmed into the portable subscriber unit 122, the server 124 transmits 404 the template data through the wireless communication system to the intended portable subscriber unit 122. The portable subscriber unit 122 receives 406 the template data and then displays 408 the template data in accordance with the templates of the pack. Because the pack is separated from the template data, the pack can be kept in the portable subscriber unit 122 for future reuse. Keeping the pack in the portable subscriber unit 122 advantageously reduces latency for template data that is repeatedly updated and displayed in a fixed format, e.g., information services data such as a stock report. When the pack is stored in the portable subscriber unit 122, the pack is preferably cached in the pack cache 226. It will be appreciated that, alternatively, a frequently used pack such as the pack 209, can be programmed into the ROM 205 during manufacture or upon activation of the portable subscriber unit 122, for long-time use.

Figure 5:
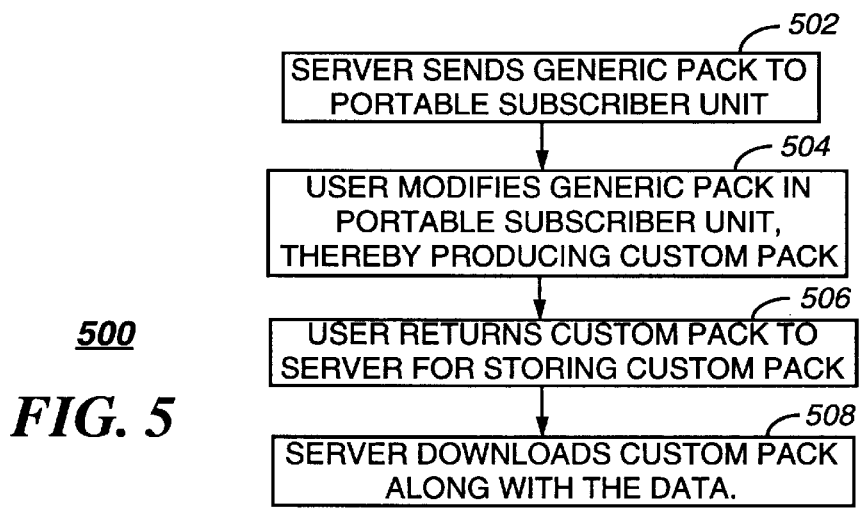
FIG. 5 is a flow diagram depicting a first programming operation of the wireless communication system in accordance with the present invention.

FIG. 5 is a flow diagram 500 depicting a first programming operation of the wireless communication system in accordance with the present invention. The diagram 500 begins with the server 124 sending 502 a generic pack to the portable subscriber unit 122. Preferably, the generic pack is transmitted through the wireless communication system as a single unit. The user of the portable subscriber unit 122 then can modify 504 the generic pack through the user interface 214 of the portable subscriber unit 122, thereby producing a custom pack. The user then returns 506 the custom pack to the server 124 for storing the custom pack. Preferably, the transactions between the user and the server 124 take place through the wireless communication system. It will be appreciated that, alternatively, the transactions between the user and the server 124 can take place through a wireline network as well, when the portable subscriber unit 122 is equipped with a conventional wireline network interface (not shown). The server then downloads 508 the custom pack to the portable subscriber unit 122, preferably as a single unit transmission, whenever the server 124 sends the corresponding template data to the portable subscriber unit 122. This form of operation advantageously saves memory in the portable subscriber unit 122, but at the cost of some added latency and air link resources. It will be appreciated that, alternatively, the custom pack can be stored in the portable subscriber unit 122 for improved latency, when sufficient memory is available in the portable subscriber unit 122.

Figure 6:
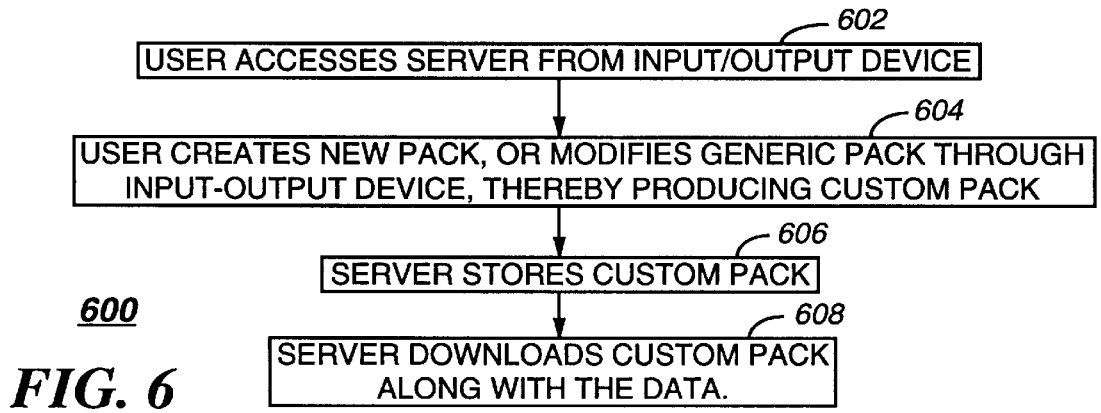
FIG. 6 is a flow diagram depicting a second programming operation of the wireless communication system in accordance with the present invention.

FIG. 6 is a flow diagram 600 depicting a second programming operation of the wireless communication system in accordance with the present invention. The diagram 600 begins when the user accesses 602 the server 124 from an input/output device. The input/output device can be, for example, a personal computer, a keyboard-display terminal, a display with a handwriting recognition device, a speech recognition device, or the portable subscriber unit 122, to name a few. The user then creates 604 a new pack, or alternatively, modifies a generic pack through the input/output device, thereby creating a custom pack. The server 124 then stores 606 the custom pack on behalf of the portable subscriber unit 122. The server then preferably downloads 608 the custom pack to the portable subscriber unit 122 whenever the server sends the corresponding template data to the portable subscriber unit 122. Preferably, the pack is downloaded through the wireless communication system as a single unit. It will be appreciated that, alternatively, the server 124 can download the custom pack to the portable subscriber unit 122 immediately after the user creates the custom pack, and the portable subscriber unit 122 can store the custom pack in the memory 212, when sufficient space is available therein.

Figure 7:
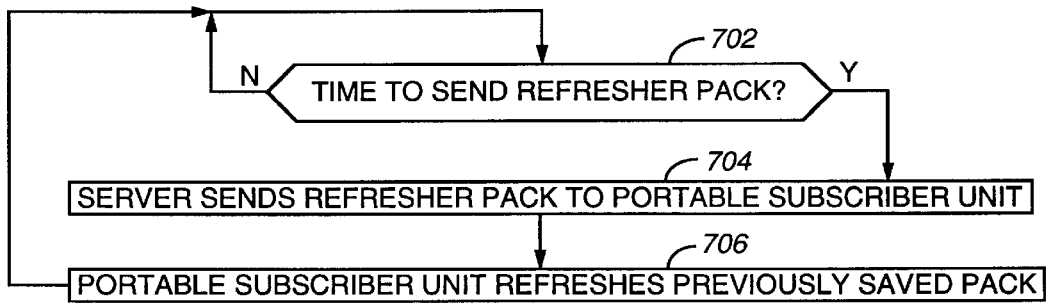
FIG. 7 is a flow diagram depicting a third programming operation of the wireless communication system in accordance with the present invention.

FIG. 7 is a flow diagram 700 depicting a third programming operation of the wireless communication system in accordance with the present invention. The diagram 700 begins with the server checking 702 whether it is time to send a refresher pack to the subscriber unit 122. If not, the server keeps checking. When it is time to send the refresher pack, the server 124 sends 704 the refresher pack to the portable subscriber unit 122 through the wireless communication system. In response, the portable subscriber unit 122 refreshes 706 the previously saved pack in the memory 212. This technique is advantageous for updating a pack that changes frequently, and for replacing a pack that may have been lost when the portable subscriber unit 122 was powered down.

Figure 8:
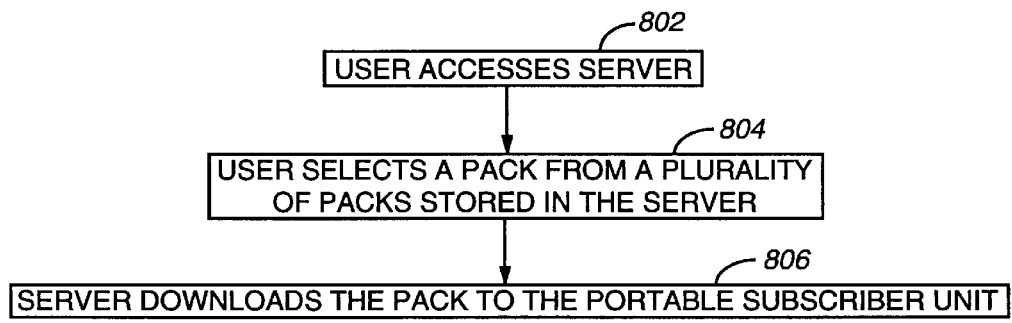
FIG. 8 is a flow diagram depicting a fourth programming operation of the wireless communication system in accordance with the present invention.

FIG. 8 is a flow diagram 800 depicting a fourth programming operation of the wireless communication system in accordance with the present invention. The diagram 800 begins with the user accessing 802 the server 124 to choose a pack. The user then selects 804 a pack from a plurality of packs stored in the mass medium 314 of the server 124. The server 124 then downloads 806 the pack to the portable subscriber unit 122. It will be appreciated that, alternatively, the server 124 can store the pack on behalf of the portable subscriber unit 122, and download the pack to the portable subscriber unit 122 each time the server 124 sends template data corresponding to the pack to the portable subscriber unit 122. When this alternative is employed, the pack preferably is downloaded through the wireless communication system as a single unit.

Thus, it should be clear from the preceding disclosure that the present invention provides a method and apparatus in a wireless communication system for controlling a display of template data by a portable subscriber unit. In particular, the method and apparatus advantageously reduces the size of data downloads by separating the template from the template data, and allows customization the display of the template data according to the desires of the end-user.

Many modifications and variations of the present invention are possible in light of the above teachings. Thus, it is to be understood that, within the scope of the appended claims, the invention can be practiced other than as described herein above.

What is claimed is:

1. A method in a wireless communication system for controlling a display of template data by a portable subscriber unit, the method comprising the steps of:
    programming a pack into the portable subscriber unit, the pack comprising a bundle of templates for formatting the template data for display on at least one page, comprising the steps of:
        sending a generic pack from a server to the portable subscriber unit;
        modifying the generic pack, by a user of the portable subscriber unit, thereby producing a custom pack;
        returning the custom pack to the server for storing the custom pack; and
        downloading the custom pack from the server;
    transmitting the template data from the server;
    receiving the template data by the portable subscriber unit; and
    displaying the template data in accordance with the custom pack.

2. The method of claim 1, wherein the programming step comprises the steps of:
    accessing the server, by a user, from an input/output device;
    performing, by a user, one of creating and modifying the pack through the input/output device, thereby producing the custom pack;
    storing the custom pack in the server; and
    downloading the custom pack from the server along with transmitting the template data.

3. The method of claim 1, wherein the programming step comprises the steps of:
    sending the pack from the server to the portable subscriber unit; and
    caching the pack in the portable subscriber unit.

4. The method of claim 1, wherein the programming step comprises the steps of:
    sending a refresher pack from the server to the portable subscriber unit on a periodic basis; and
    refreshing a previously saved pack stored in the portable subscriber unit, in response to receiving the refresher pack.

5. The method of claim 1, wherein the programming step comprises the step of:
    storing the pack in a read-only memory of the portable subscriber unit.

6. The method of claim 1, wherein the programming step comprises the step of:
    selecting, by a user, the pack from a plurality of packs stored in the server; and
    thereafter, downloading the pack to the portable subscriber unit.

7. The method of claim 1, wherein the programming step comprises the step of
    programming the pack into the portable subscriber unit, the pack consisting of a single template for formatting the template data for display on one page.

8. A portable subscriber unit in a wireless communication system for controlling a display of template data received from a server, the portable subscriber unit comprising:
    a transceiver for communicating with the server to receive the template data;
    a processing system coupled to the transceiver for processing the template data, the processing system comprising a memory; and
    a user interface coupled to the processing system for displaying the template data and for accepting an input from a user,
    wherein the processing system is programmed with a pack comprising a bundle of templates for formatting data template data for display on at least one page, and
    wherein the processing system is further programmed to:
        cooperate with the transceiver to receive a generic pack from the server;
        cooperate with the user interface to allow the user to modify the pack, thereby producing a custom pack;
        cooperate further with the transceiver to return the custom pack to the server for storing the custom pack;
        cooperate further with the transceiver to download the custom pack from the server along with the template data; and
        cooperate further with the user interface to display the template data in accordance with the custom pack.

9. The portable subscriber unit of claim 8, wherein the processing system is further programmed to:
    cooperate with the user interface and the transceiver to allow access to the server by the user;
    cooperate further with the user interface and the transceiver to allow the user to create or modify the pack through the user interface, thereby producing the custom pack;
    cooperate with the server to store the custom pack in the server; and
    cooperate further with the transceiver to download the custom pack from the server along with the template data.

10. The portable subscriber unit of claim 8, wherein the processing system is further programmed to:
    cooperate with the transceiver to receive the pack from the server; and
    cache the pack in the memory.

11. The portable subscriber unit of claim 8, wherein the processing system is further programmed to:
    cooperate with the transceiver to receive a refresher pack from the server, the refresher pack transmitted from the server on a periodic basis; and
    refresh a previously saved pack stored in the memory, in response to receiving the refresher pack.

12. The portable subscriber unit of claim 8, further comprising
    a read-only memory, and wherein the processing system is further programmed to:
    store the pack in the read-only memory.

13. The portable subscriber unit of claim 8, wherein the processing system is further programmed to:
    cooperate with the user interface and the transceiver to allow the user to select the pack from a plurality of packs stored in the server; and
    download the pack to the portable subscriber unit after the user selects the pack.

14. A server in a wireless communication system for controlling a display of template data by a portable subscriber unit, the server comprising:

a communication interface coupled to a controller of the wireless communication system for communicating therewith; and a processing system coupled to the communication interface for processing information communicated through the communication interface, the processing system comprising a memory, wherein the processing system is programmed to:

send a pack to the portable subscriber unit, the pack comprising a bundle of templates for formatting the template data for display on at least one page, the pack to be modified by a user of the portable subscriber unit thereby producing a custom pack;

receive the custom pack from the portable subscriber unit for storing in the memory; and download the custom pack to the portable subscriber unit along with the template data.

15. The server of claim 14, wherein the processing system is further programmed to:

provide access to the server, by a user, from an input/output device;

allow a user to perform one of creating and modifying the pack through the input/output device, thereby producing the custom pack; and store the custom pack in the memory.

16. The server of claim 14, wherein the processing system is further programmed to send a refresher pack to the portable subscriber unit on a periodic basis.

17. The server of claim 14, wherein the processing system is further programmed to:

allow selection, by a user, of the pack from a plurality of packs stored in the memory; and thereafter, download the pack to the portable subscriber unit.

* * * * *